(12) United States Patent
Chang et al.

(10) Patent No.: US 6,854,890 B2
(45) Date of Patent: Feb. 15, 2005

(54) BEARING ASSEMBLY

(75) Inventors: Chin-Hung Chang, Shenzhen (CN);
Yu-cheng Chou, Shenzhen (CN)

(73) Assignee: Hon Hai Precision Ind. Co., LTD,
Taipei Hsien (TW)

( * ) Notice: Subject to any disclaimer, the term of this patent is extended or adjusted under 35 U.S.C. 154(b) by 83 days.

(21) Appl. No.: 10/302,057

(22) Filed: Nov. 21, 2002

(65) Prior Publication Data

US 2003/0223662 A1 Dec. 4, 2003

(30) Foreign Application Priority Data

May 30, 2002 (TW) ...................................... 91207935 U

(51) Int. Cl.[7] .............................................. F16C 33/24
(52) U.S. Cl. .................................. 384/279; 384/907.1
(58) Field of Search .............................. 384/279, 907.1, 384/902, 276, 282, 283, 297, 322, 397

(56) References Cited

U.S. PATENT DOCUMENTS

| | | | | |
|---|---|---|---|---|
| 1,234,853 A | * | 7/1917 | Bache | ......................... 384/283 |
| 2,086,787 A | * | 7/1937 | Whiteley | ..................... 384/902 |
| 4,290,655 A | * | 9/1981 | Apuzzo et al. | .............. 384/286 |
| 5,028,148 A | * | 7/1991 | Kanamaru et al. | ........... 384/279 |
| 5,549,394 A | * | 8/1996 | Nowak et al. | .............. 384/282 |

\* cited by examiner

Primary Examiner—Thomas R. Hannon
(74) Attorney, Agent, or Firm—Wei Te Chung

(57) ABSTRACT

A bearing assembly includes a generally cylindrical main unit (10) made of ceramic material, and two blocks (30) made of sintered metallic material housed in the main unit. The main unit includes a cylindrical sleeve (12), and two opposite protrusions (14) arranged inside the sleeve. Each protrusion defines an inmost first support wall (20), and a through hole (24) that is narrow at a middle portion and flared at opposite ends. A slit (26) is defined in the protrusion between the first support wall and the through hole. The blocks are received in two corresponding cavities (18) defined between the protrusions. Each block defines an inmost second support wall (36). The first and second support walls cooperatively define a bearing bore (22) therebetween for receiving a rotatable shaft. The blocks have good lubricant-retaining characteristics. The highly rigid protrusions can accurately hold the shaft and protect the blocks from excessive abrasion.

16 Claims, 5 Drawing Sheets

BEARING ASSEMBLY

BACKGROUND OF THE INVENTION

1. Field of the Invention

The present invention relates to a bearing assembly, and particularly to a bearing assembly which has a sleeve receiving blocks therein.

2. Related Art

Bearings of conventional fans are usually sintered bearings, ball bearings or ceramic bearings. A sintered bearing is made of sintered metallic material, and has many pores. The pores act as lubrication reservoirs, and prevent unwanted leakage of lubricant. Thus the sintered bearing can provide good lubrication. However, a typical shaft is made of highly rigid material. Therefore the surface of the sintered bearing is easily abraded by the shaft, and is prone to have a rather short working life.

A ball bearing can operate without lubrication, and has a longer working life. However, ball bearings are generally costly. In addition, noise generated by a ball bearing increases over its working lifetime as it becomes progressively more worn. When the fan is used in a device such as a computer in a relatively quiet environment such as an office, the ball bearing eventually produces too much noise.

A ceramic bearing has high rigidity, and therefore can operate over a relatively long lifetime. However, ceramic material is highly non-porous. Thus the ceramic bearing is prone to excessive unwanted leakage of lubricant. The contact surface of the ceramic bearing becomes rough after prolonged use without adequate lubrication. Frictional resistance of the ceramic bearing is increased. This makes it more difficult to start the motor of the fan, and decreases the efficiency of operation of the motor.

SUMMARY OF THE INVENTION

Accordingly, an object of the present invention is to provide a bearing which has low unwanted leakage of lubricant, low friction, and a long lifetime.

To achieve the above-mentioned object, a bearing assembly in accordance with a preferred embodiment of the present invention includes a generally cylindrical main unit made of ceramic material, and two blocks made of sintered metallic material housed in the main unit. The main unit includes a cylindrical sleeve, and two opposing protrusions protruding from an inside surface of the cylindrical sleeve. Each protrusion defines an inmost first support wall, and a through hole that is narrow at a middle portion and flared at opposite ends. A slit is defined in the protrusion between the first support wall and the through hole. The blocks are received in a pair of corresponding cavities defined between the protrusions of the main unit. Each block defines an inmost second support wall. The first and second support walls of the main unit and the blocks cooperatively define a bearing bore therebetween. The blocks have good lubricant-retaining characteristics. The highly rigid protrusions can accurately hold a shaft therebetween. Accordingly, the main unit can prevent the blocks from sustaining excessive abrasion by the shaft, which increases a working lifespan of the bearing assembly.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
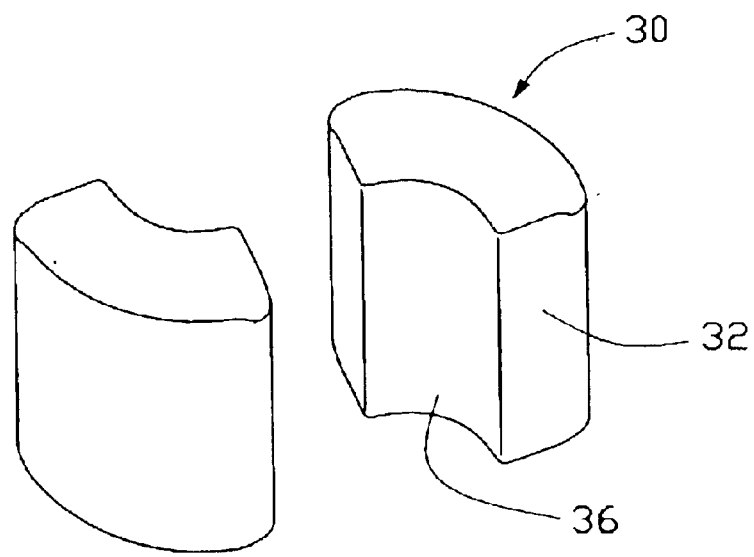
FIG. 1 is an exploded isometric view of a bearing assembly in accordance with the present invention.
Figure 1:
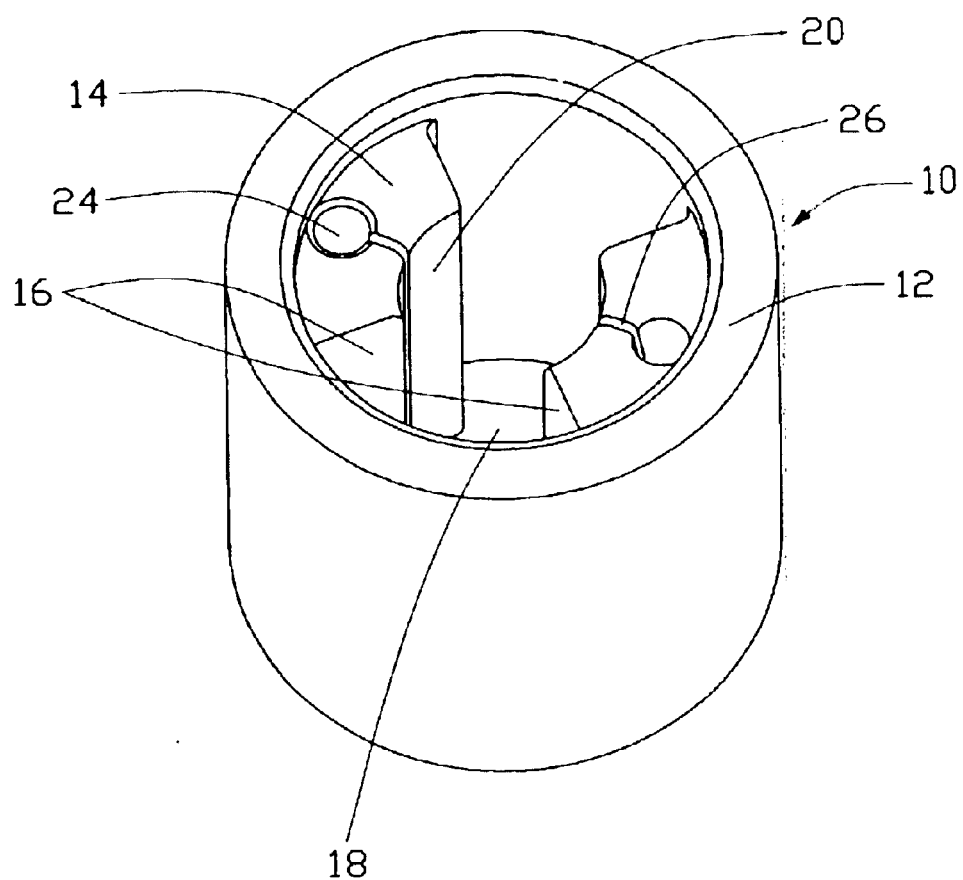

Referring to FIG. 1, a bearing assembly in accordance with a preferred embodiment of the present invention comprises a generally cylindrical main unit 10 and two blocks 30 housed in the main unit 10.

The main unit 10 is made of ceramic material comprising aluminum oxide and silicon oxide. Each block 30 is made of a sintered metallic material made from iron and copper particles. It is to be understood that in an alternative embodiment of the present invention, the main unit 10 may be made of a sintered metallic material made from iron and copper particles, and each block 30 may be made of ceramic material comprising aluminum oxide and silicon oxide.

Figure 2:
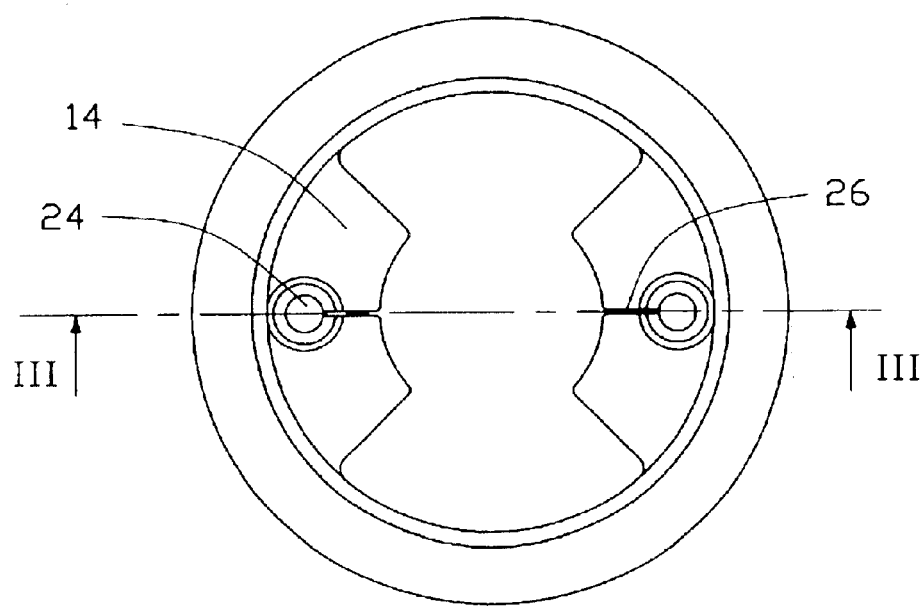
FIG. 2 is a top plan view of a main unit of the bearing assembly of FIG. 1.
Figure 3:
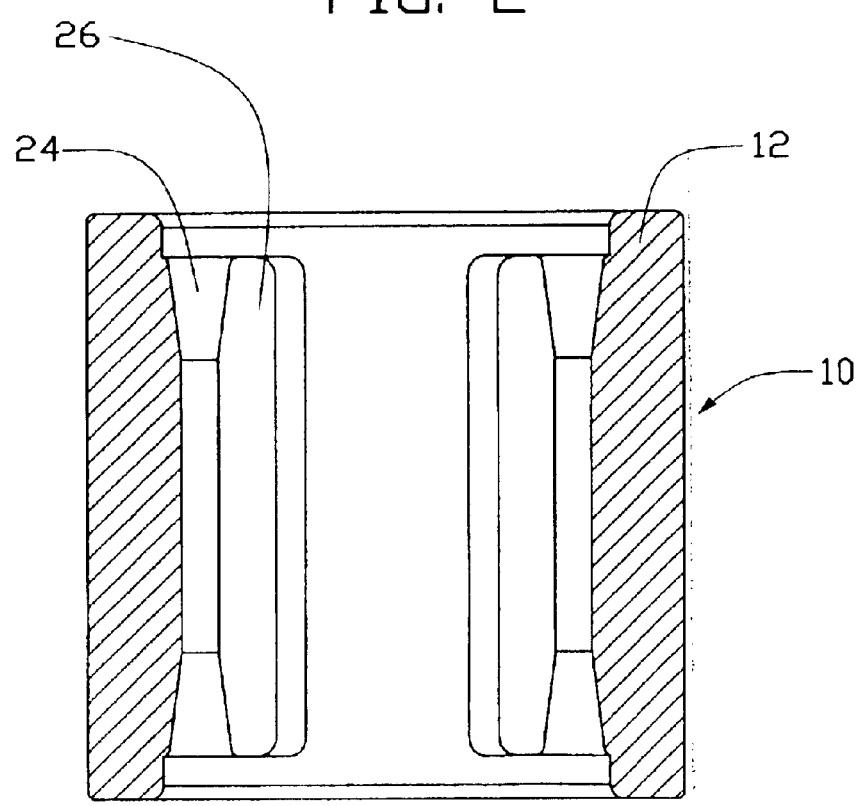
FIG. 3 is a cross-sectional view of the main unit shown in FIG. 2, taken along line III—III of FIG. 2.
Figure 4:
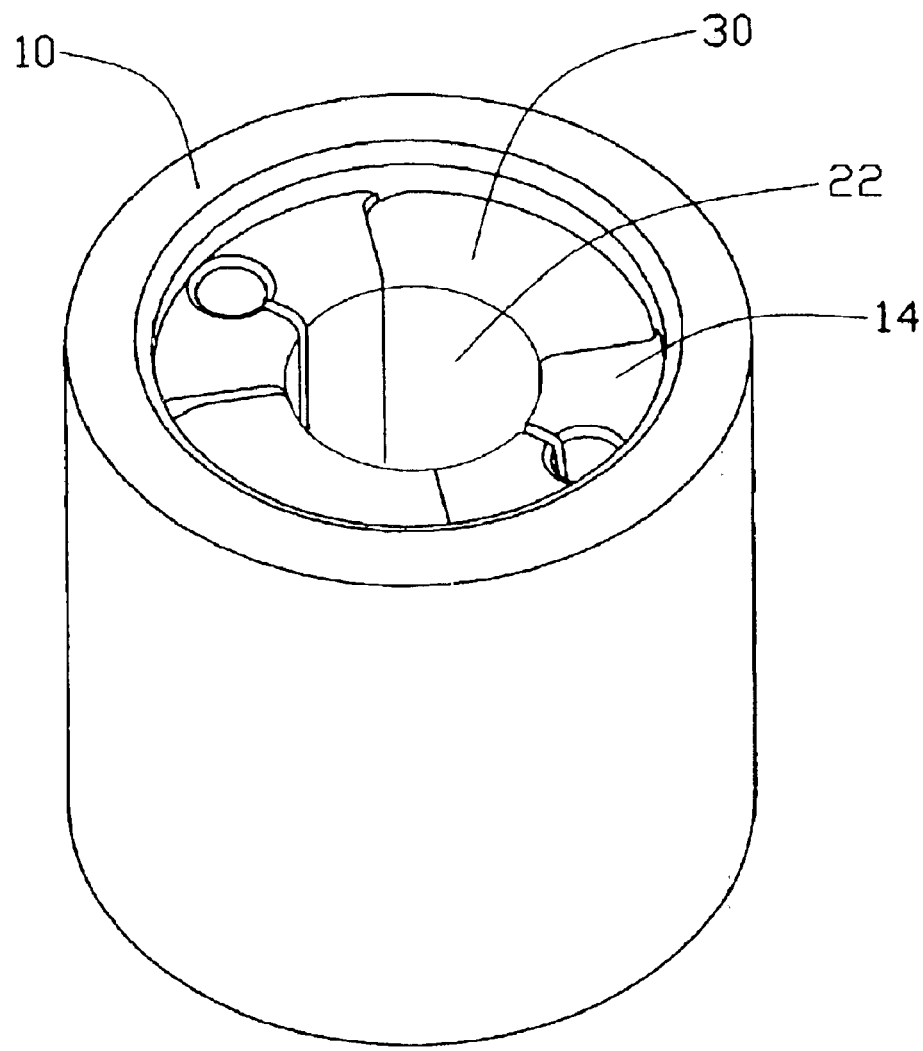
FIG. 4 is an assembled view of FIG. 1.

Referring also to FIGS. 2–4, the main unit 10 comprises a cylindrical sleeve 12 and two opposite protrusions 14 protruding inwardly from an inside surface of the cylindrical sleeve 12. Each protrusion 14 has two opposite first lateral sides 16. A cavity 18 is defined between one pair of neighboring first lateral sides 16 of the protrusions 14. Another cavity 18 is defined between another pair of neighboring first lateral sides 16 of the protrusions 14. An arcuate first support wall 20 is defined at an inmost side of each protrusion 14, between the first lateral sides 16. A through hole 24 is defined in the protrusion 14 parallel with a central axis of the main unit 10, for retaining lubricant therein. The through hole 24 is preferably narrow at a middle portion thereof, and flared at opposite ends thereof. This configuration of the through hole 24 enables lubricant to be retained therein without unwanted leakage, by reason of surface tension of the lubricant. A longitudinal slit 26 is defined in the protrusion 14. The slit 26 spans between the first support wall 20 and the through hole 24, and communicates with the through hole 24.

The blocks 30 are received in the cavities 18 of the main unit 10 respectively. Each block 30 has two opposite second lateral sides 32. An arcuate second support wall 36 is defined at an inmost side of each block 30, between the second lateral sides 32. Each block 30 is fittingly received in the corresponding cavity 18, with the second lateral sides 32 of the block 30 closely abutting corresponding first lateral sides 16 of the protrusions 14. The first support walls 20 of the protrusions 14 and the second support walls 36 of the blocks 30 have a same radius of curvature, so that the first and second support walls 20, 36 cooperatively define a bearing bore 22 therebetween.

Figure 5:
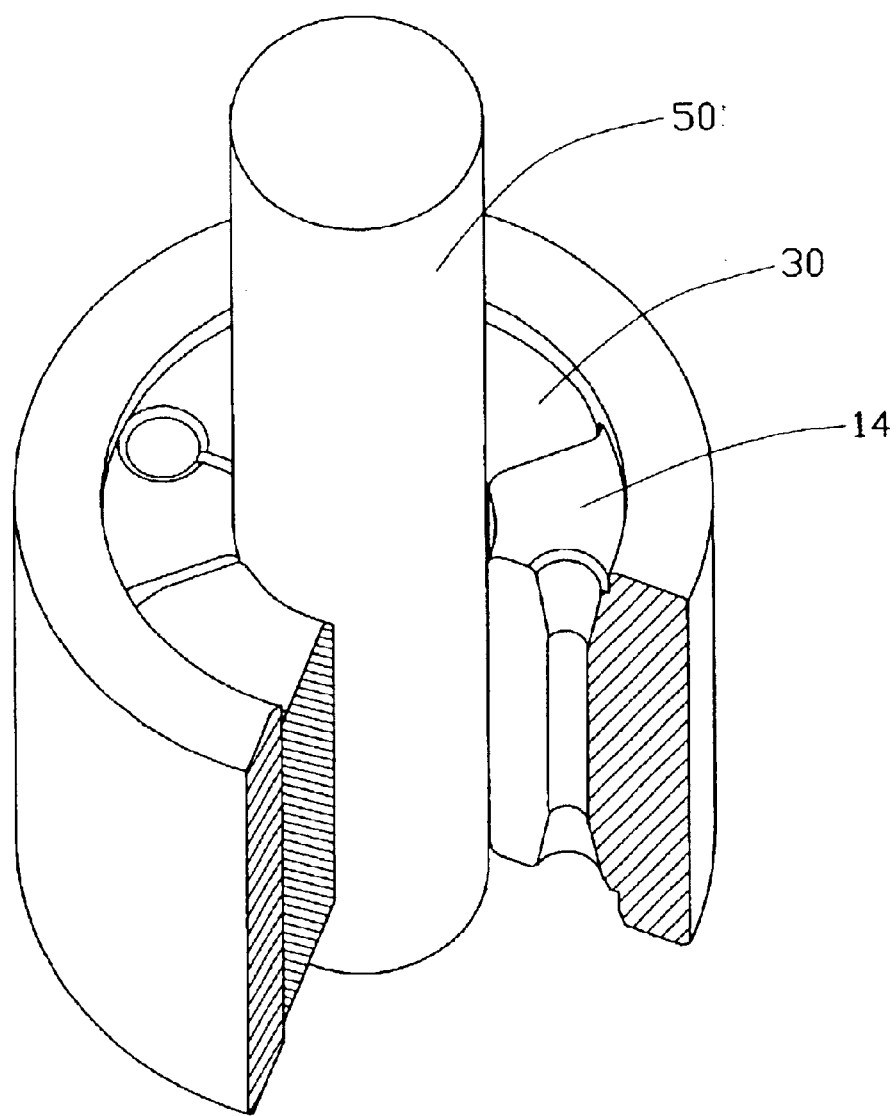
FIG. 5 is similar to FIG. 4, but showing a shaft received in the bearing assembly, and showing the bearing assembly partly cut away.
Figure 6:
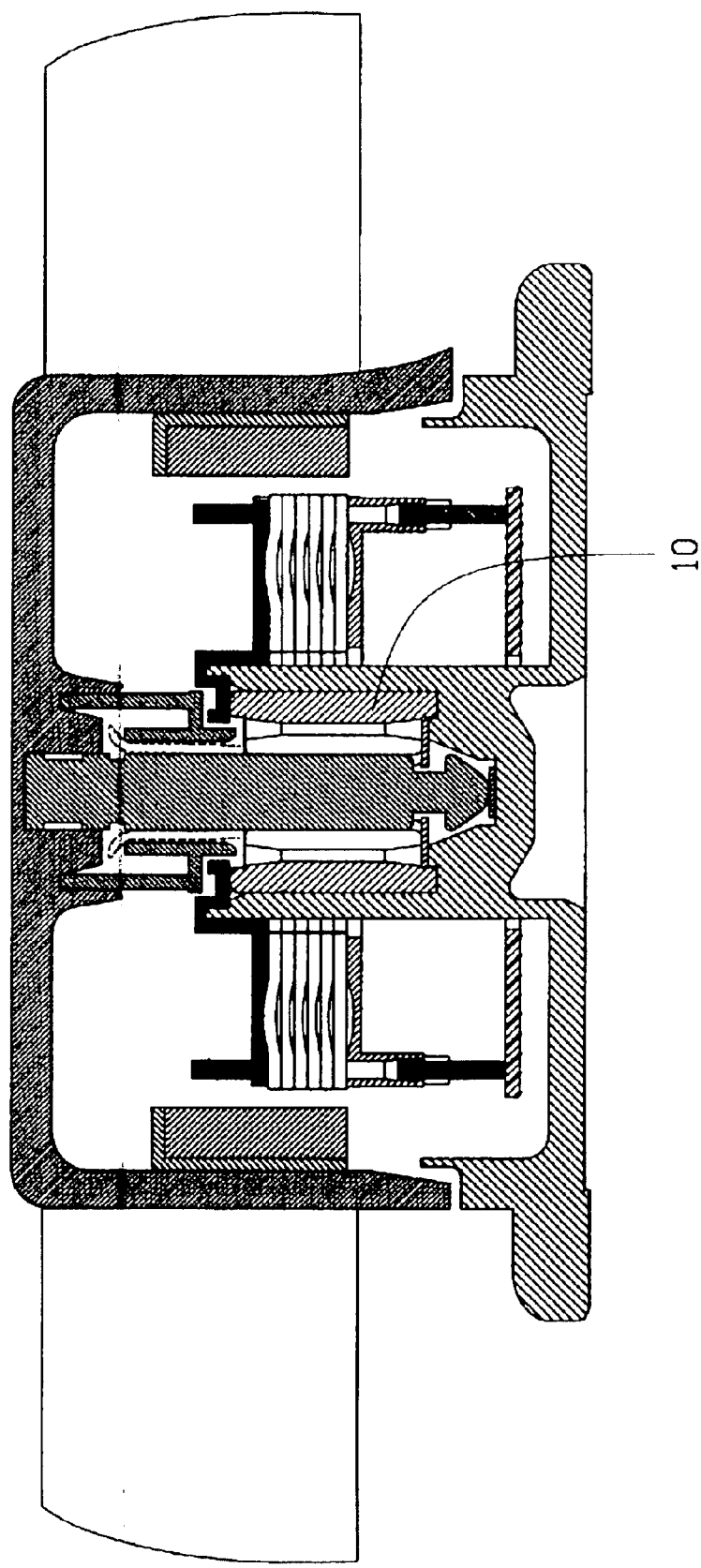
FIG. 6 is a side elevation cross-sectional view of a fan with the bearing assembly of the present invention installed therein.

Referring also to FIG. 5, a shaft 50 is rotatably received in the bearing bore 22. The shaft 50 contacts the first and second support walls 20, 36 when it rotates during operation. Thus the shaft 50 generates considerable heat. The lubricant stored in each through hole 24 is heated, and expands through the slit 26 to the first support wall 20 of the protrusion 14. The lubricant then travels to the second support walls 36 by way of heat expansion and rotation of the shaft 50. Thus a layer of lubricant is formed between the shaft 50 and the first and second support walls 20, 36 of the bearing assembly so as to reduce frictional resistance. Because the blocks 30 are made of sintered metallic material, they have many pores. Accordingly, the blocks 30 have good lubricant-retaining characteristics. Because the main unit 10 is made of ceramic material, it is highly rigid. Thus the protrusions 14 can accurately hold the shaft 50 therebetween. Accordingly, the main unit 10 can prevent the blocks 30 from sustaining excessive abrasion by the shaft 50, which increases a working lifespan of the bearing assembly. In summary, the bearing assembly has low unwanted leakage of lubricant, low friction, and a long working lifetime.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A bearing assembly comprising:
   a main unit comprising a sleeve and two opposite protrusions arranged inside the sleeve, each of the protrusions defining a first support wall opposing the other protrusion, a hole for retaining lubricant therein, and a slit spanning from the first support wall to the hole; and
   two blocks received in the sleeve respectively between the protrusions, each of the blocks defining a second support wall opposing the other block; wherein
   the first and second support walls cooperatively define a bore therebetween for receiving a rotatable shaft therein.

2. The bearing assembly as claimed in claim 1, wherein the main unit and the blocks are respectively made of two different materials.

3. The bearing assembly as claimed in claim 2, wherein one of the materials is sintered metallic material, and the other material is ceramic material.

4. The bearing assembly as claimed in claim 1, wherein each of the protrusions has two opposite first lateral sides.

5. The bearing assembly as claimed in claim 1, wherein each of the blocks has two opposite second lateral sides fittingly abutting corresponding first lateral sides of the protrusions.

6. The bearing assembly as claimed in claim 1, wherein the first and second support walls have a same radius of curvature.

7. The bearing assembly as claimed in claim 1, wherein the hole is narrow at a middle portion thereof, and is flared at opposite ends thereof.

8. A bearing assembly comprising:
   a main unit comprising a sleeve and at least one protrusion provided inside the sleeve, the at least one protrusion having a first lateral side; and
   at least one block received in the sleeve, the at least one block having a second lateral side abutting the first lateral side;
   wherein the at least one protrusion and the at least one block each define a support wall facing a center of the sleeve, and the support walls cooperatively define a bore therebetween for holding a rotatable shaft therein; and wherein
   each of the at least one protrusion defines a hole for retaining lubricant therein, and a slit spanning from the support wall of the at least one protrusion to the hole.

9. The bearing assembly as claimed in claim 8, wherein the main unit and the at least one block are respectively made of two different materials.

10. The bearing assembly as claimed in claim 9, wherein one of the materials is sintered metallic material, and the other material is ceramic material.

11. A bearing assembly comprising:
    a first set of supporting pieces made from a friction-resistant material;
    a second set of supporting pieces made from a lubrication-retaining material; wherein
    said first set of supporting pieces and said second set of supporting pieces are circumferentially alternately arranged with each other, lubricant are stored in the first set of supporting pieces.

12. The assembly as claimed in claim 11, wherein a slit is provided to communicate the stored lubricant and a space said first and second supporting pieces occupy.

13. The assembly as claimed in claim 11, wherein rotated shaft is located in a center portion among said first and second set of supporting pieces.

14. The assembly as claimed in claim 11, wherein said first set of supporting pieces is made from ceramic.

15. The assembly as claimed in claim 11, wherein said second set of supporting pieces is made from sintered metallic material.

16. The assembly as claimed in claim 11, wherein a rotated shaft is located in a center portion among said first and second set of supporting pieces, and a slit is provided to communicate the stored lubricant with the shaft.

* * * * *